(12) United States Patent
Hill et al.

(10) Patent No.: US 9,137,527 B2
(45) Date of Patent: Sep. 15, 2015

(54) COMMUNICATION SIGNAL STRENGTH DISPLAY FOR TV INTERNET ADAPTER

(75) Inventors: Seth Hill, La Mesa, CA (US); Yuko Nishikawa, La Jolla, CA (US); Toshiro Ozawa, San Diego, CA (US); David Tao, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1369 days.

(21) Appl. No.: 11/937,901

(22) Filed: Nov. 9, 2007

(65) Prior Publication Data
US 2009/0125969 A1 May 14, 2009

(51) Int. Cl.
| | |
|---|---|
| H04N 17/00 | (2006.01) |
| H04N 21/462 | (2011.01) |
| H04N 21/431 | (2011.01) |
| H04N 21/4363 | (2011.01) |
| H04N 21/442 | (2011.01) |
| H04N 21/61 | (2011.01) |

(52) U.S. Cl.
CPC ......... *H04N 17/004* (2013.01); *H04N 21/4312* (2013.01); *H04N 21/4314* (2013.01); *H04N 21/43637* (2013.01); *H04N 21/44209* (2013.01); *H04N 21/4622* (2013.01); *H04N 21/6125* (2013.01); *H04N 21/6131* (2013.01)

(58) Field of Classification Search
CPC ............ H04N 5/23241; H04N 5/2258; H04N 5/23203; H04N 5/23206; H04N 5/23245; H04N 5/772; H04N 5/907; H04N 9/8042; H04N 9/8205; H04N 21/4622
USPC ............. 725/78–81, 110–112, 131, 133, 139, 725/141, 143, 152; 455/515, 456.3; 370/338
See application file for complete search history.

(56) References Cited

U.S. PATENT DOCUMENTS

| | | | | |
|---|---|---|---|---|
| 6,763,522 | B1* | 7/2004 | Kondo et al. | 725/39 |
| 6,810,413 | B1* | 10/2004 | Rajakarunanayake et al. | 709/203 |
| 7,606,570 | B2* | 10/2009 | Karaoguz et al. | 455/442 |
| 2005/0091355 | A1* | 4/2005 | Keohane et al. | 709/223 |
| 2005/0159125 | A1* | 7/2005 | Lodolo et al. | 455/226.4 |
| 2005/0289633 | A1* | 12/2005 | Dow, III | 725/131 |
| 2006/0184986 | A1* | 8/2006 | Urban | 725/100 |
| 2006/0264227 | A1* | 11/2006 | Takahashi et al. | 455/513 |
| 2007/0060152 | A1 | 3/2007 | Sakamoto | |
| 2007/0067734 | A1* | 3/2007 | Cunningham et al. | 715/779 |
| 2007/0091861 | A1* | 4/2007 | Gupta et al. | 370/338 |
| 2007/0143801 | A1* | 6/2007 | Madonna et al. | 725/80 |
| 2008/0201751 | A1* | 8/2008 | Ahmed et al. | 725/109 |

* cited by examiner

*Primary Examiner* — Pankaj Kumar
*Assistant Examiner* — Alazar Tilahun
(74) *Attorney, Agent, or Firm* — John L. Rogitz

(57) ABSTRACT

A wireless signal strength indication is displayed on a TV, representing the signal strength of a wireless link between the Internet and an Internet adapter module providing Internet video to the TV.

7 Claims, 2 Drawing Sheets

COMMUNICATION SIGNAL STRENGTH DISPLAY FOR TV INTERNET ADAPTER

FIELD OF THE INVENTION

The present invention relates generally to communication signal strength indications for TV Internet adapters.

BACKGROUND OF THE INVENTION

TV manufacturers may wish to provide TVs with built-in interactive devices, e.g., personal video recorders (PVR), optical disk players such as Blu-Ray disk players and digital video disk (DVD) players and the like, so that a customer conveniently need purchase only the TV with interactive devices in a single seamless system. As recognized by the present assignee, it would be further desirable to provide the interactive devices with the TV in modular form so that as new and upgraded interactive devices become available, the TV system may be upgraded by replacing an old module with a new one without having to purchase an entirely new TV system.

The fusion of television with the Internet is a continuing goal that has spawned systems making it convenient for viewers to access content from both conventional TV sources and the Internet using a single TV chassis. In this way, the number of programs that can be made available to people using the familiar technology of television can be expanded enormously.

SUMMARY OF THE INVENTION

As understood herein, in a TV Internet adapter that communicates audio video data over a high definition multimedia (HDMI) link to the TV and that exchanges control data with the TV over a universal serial bus (USB) link, if the adapter is communicating with the Internet over a wireless link, it is helpful to the viewer to know what the link signal strength is, so that the viewer can better understand why, for instance, a video from the adapter might not be displayed satisfactorily.

Accordingly, a system includes a TV including a TV display, and an Internet adapter module connected to the TV using at least an audio video link. The module receives Internet video over a wireless link for display of the video on the TV. An indication of wireless link signal strength can be displayed on the TV.

The audio video link can be a high definition multimedia (HDMI). A control link between the module and TV can also be provided and can be a universal serial bus (USB) link.

In another aspect, a tangible digital storage medium is readable by a TV processor to display a wireless link signal strength indication on a TV display associated with a TV that is configured for communicating with an adapter module over at least a video data link. The signal strength is related to a wireless link between the module and the Internet.

In yet another aspect, a TV includes a TV processor configured for communicating with an adapter module over at least a video data link and a control data link, and a TV display con figured for displaying video received on the video data link under control of the TV processor. The TV processor selectively causes a signal strength indication to be displayed on the TV, with the signal strength representing a wireless link between the module and the Internet.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
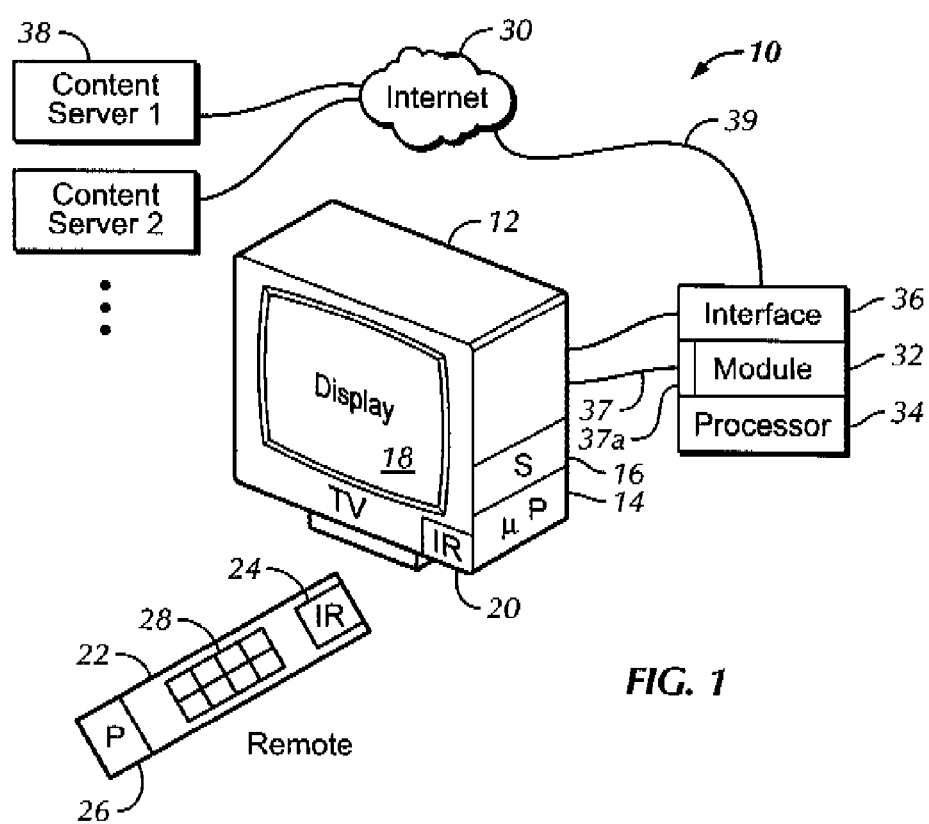
FIG. 1 is a schematic view of a non-limiting system in accordance with present principles.

Referring initially to FIG. 1, a system is shown, generally designated 10, that includes a TV 12 with TV processor 14 and tangible digital storage medium 16 that may be, without limitation, a magnetic or optical disk drive, a solid state device such as random access memory or read-only memory or flash memory, a removable stick medium or removable floppy disk, etc. The medium 16 and processor 14 may be stored in the TV housing as shown along with a display 18 such as but not limited to a high definition (HD) matrix display or a standard definition cathode ray tube display, or the processor 14 and/or medium 16 may be external to the TV housing, e.g., in a set-top box or in the below-discussed module.

The TV 12 typically includes a wireless receiver such as but not limited to an IR receiver 20 for receiving wireless signals from a hand-held remote control 22 having a wireless transmitter such as but not limited to an IR transmitter 24. A processor 26 in the remote control 22 can receive input from a user-manipulable key array 28 in accordance with principles known in the art to cause the transmitter 24 to send wireless signals to the TV 12, including cursor control signals to move a cursor on the display 18.

In the non-limiting embodiment shown in FIG. 1, audio-video content from a wide area computer network such as the Internet 30 can be provided to the TV 12 for presentation on the display 18 using a Internet adapter module 32 that may have a module processor 34. The module 32 may communicate audio video data with the TV 12 using a communication interface 36 such as a high definition multimedia interface (HDMI) to provide content from the Internet to the TV. Also, the module 32 can exchange control information over a control link 37 with the TV by means of a control link interface 37a such as a universal serial bus (USB) interface. This control information may include commands and GUT elements used for display and user interaction.

The module 32, which can be implemented as a set-back box (SBB), may be physically engaged with the housing of the TV 12 with communication being established by respective connectors on the module and TV, or the module 32 may be connected via a cord to the TV 12. In any case, the module 32 can be connected to the Internet typically by a computer cable that extends from the housing of the module 32 to an Internet jack, although the module 32 alternatively may communicate with the Internet wirelessly using, e.g., Wi-Fi.

As set forth further below, audio-video content may be provided from one or more content servers 38 on the Internet 30 via the module 32 for presentation on the TV display 18. The link 39 between the module 32 and Internet 30 may be entirely wired or at least partially wireless. When the link 39 is at least partially wireless, the logic of FIG. 2 and screen display of FIG. 3 may be implemented.

Figure 2:
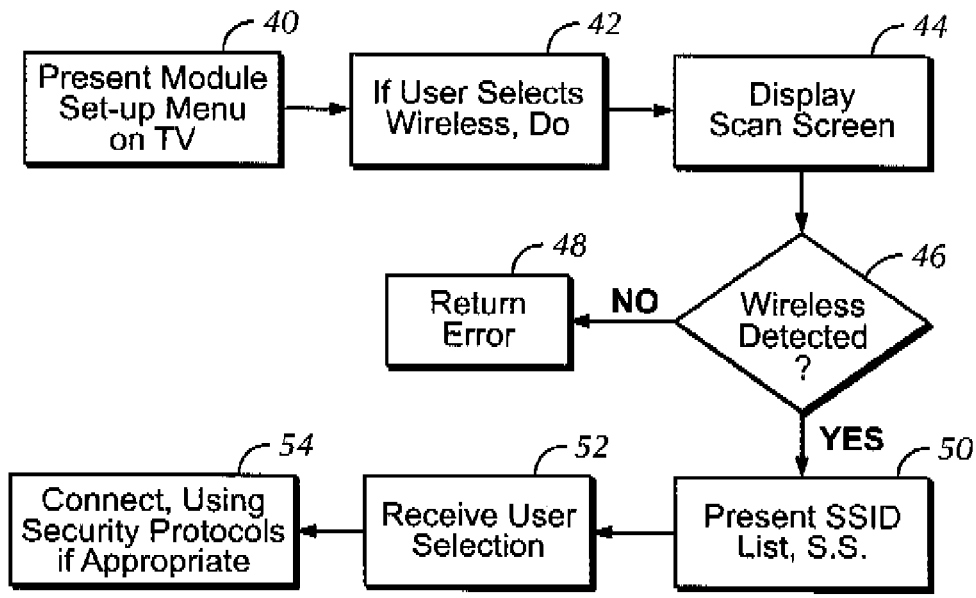
FIG. 2 is a flow chart of non-limiting logic for displaying the signal strength, which may be undertaken by the TV processor and/or module processor executing code elements stored on a computer readable medium such as the TV storage medium.

FIG. 2 shows logic that can be executed by one or both of the processors divulged above, it being understood that the TV and module processors communicate with each other over, e.g., the USB control link. Commencing at block 40 a module setup menu can be presented on the TV, e.g., in response to the first time the TV detects communication with the module 32. The set-up menu may include, e.g., a selection to allow a user to define whether the module-to-Internet connection is to be wired or wireless. The default selection may be wired; if the user selects "wireless" at block 42, the logic moves to block 44 to display a scan screen. Prior to moving to block 44, in some embodiments the logic might first determine whether the module 32 has wireless transmission and reception capability such as, e.g., Wi-Fi capability, and if it does not the logic can end.

If wireless connectivity between the module 32 and a wireless Internet gateway is not detected at decision diamond 46, an error may be returned at block 48. Otherwise, a list of nearby detected wireless access points by, e.g., service set identifier (SSID) is presented on the scan screen at block 50. Also presented next to each SSID is an indication of the wireless signal strength with the associated access point as detected by the module 32. In non-limiting embodiments signal strength may be based on, e.g., amplitude of the Wi-Fi signal received by the module 32 from the wireless access point.

A user may select which wireless access point he wishes the module 32 to use at block 52, and a connection is made by the module at block 54 with the selected access point. Security protocols may be used (e.g., by requiring login with password or network key) if appropriate for the access point selected.

Figure 3:
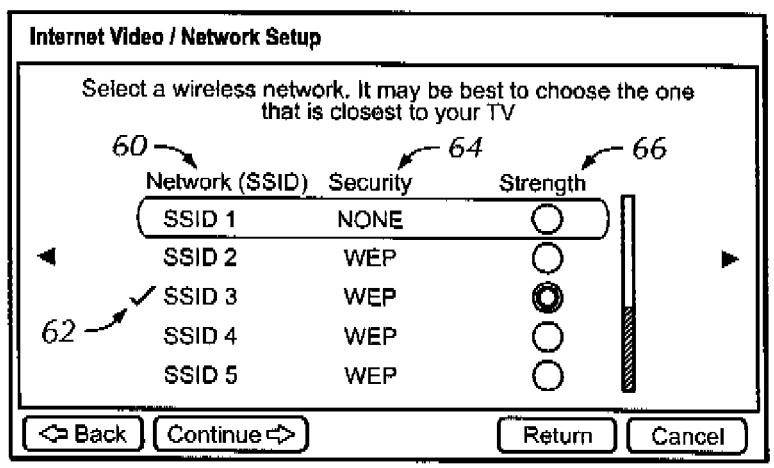
FIG. 3 shows a TV screen display presenting wireless connectivity signal strength of the adapter module.

FIG. 3 shows an example non-limiting scan screen that may be displayed on the TV. As shown, a list 60 of nearby access points by SSD may be presented, with a check mark 62 indicating which one the user has selected. A column 64 indicating security associated with each access point may be provided. Registered by row with the SSID list 60 and security column 64 is a signal strength column 66, indicating, for each access point, its associated signal strength. In the embodiment shown, one of three colors for each signal strength circle is used, green for strong signal strength, yellow for intermediate signal strength, and red for low signal strength.

While the particular COMMUNICATION SIGNAL STRENGTH DISPLAY FOR TV INTERNET ADAPTER is herein shown and described in detail, it is to be understood that the subject matter which is encompassed by the present invention is limited only by the claims.

What is claimed is:

1. A system, comprising:
a TV including a TV display; and
at least one Internet adapter module connected to the TV using at least an audio video link, the TV configured to display video received from the module over the audio video link, the module receiving Internet video over a wireless link for display of the video on the TV, an indication of wireless link signal strength being displayed on the TV, wherein a module set-up menu is presented on the TV responsive to a first time detection of the TV communicating with the adapter module, the set-up menu including at least one selector element to allow a user to define whether communication between the module and the Internet connection is to be wired or wireless, a default selection being wired, wherein responsive to a user selecting "wireless" from set-up menu is scan screen is presented on the TV, the scan screen presenting the indication of wireless link signal strength.

2. The system or claim 1, wherein the TV includes a processor causing the signal strength to be displayed.

3. The system of claim 2, wherein the audio video link is a nigh definition multimedia (HDMI) link.

4. The system of claim 3, comprising a control link between the TV and module.

5. The system of claim 4, wherein the control link is a universal serial bus (USB) link.

6. The system of claim 1, wherein the indication is a color of a signal strength icon.

7. The system of claim 6, wherein one of only three colors is used to indicate signal strength.

* * * * *